United States Patent [19]

Shimazaki

[11] Patent Number: 4,801,951

[45] Date of Patent: Jan. 31, 1989

[54] THERMAL INK-JET TYPE IMAGE FORMING APPARATUS

[75] Inventor: Takashi Shimazaki, Yokohama, Japan

[73] Assignee: Kabushiki Kaisha Toshiaba, Kawasaki, Japan

[21] Appl. No.: 36,554

[22] Filed: Apr. 9, 1987

[30] Foreign Application Priority Data

Apr. 17, 1986 [JP] Japan .................................. 61-88880

[51] Int. Cl.[4] .............................................. G01D 15/16

[52] U.S. Cl. ............................ 346/140 R; 346/76 PH; 400/126

[58] Field of Search ......... 346/140 PD, 76 PH, 76 R, 346/75; 219/216 PH; 400/120 PH, 126, 197, 202, 202.2, 248; 427/208, 209

[56] References Cited

U.S. PATENT DOCUMENTS

| | | | |
|---|---|---|---|
| 4,608,577 | 8/1986 | Hori | 346/140 PD |
| 4,630,075 | 12/1986 | Hori | 400/202.2 |
| 4,652,893 | 3/1987 | Suzuki et al. | 346/140 PD |
| 4,679,058 | 7/1987 | Hori | 346/76 PH |

FOREIGN PATENT DOCUMENTS

| | | | |
|---|---|---|---|
| 0195863 | 10/1986 | European Pat. Off. | 400/126 |
| 0201177 | 11/1986 | European Pat. Off. | 400/126 |
| 0203596 | 12/1986 | European Pat. Off. | 400/120 |
| 0203593 | 12/1986 | European Pat. Off. | 400/120 |

OTHER PUBLICATIONS

U.S. Patent Appln.: No. 919,241 (Corresponding to Japanese Patent Appln. 60-260459, Filing Date: Oct. 15, 1986, Inventor: Takashi Shimazaki.

*Primary Examiner*—H. Broome
*Assistant Examiner*—Huan H. Tran
*Attorney, Agent, or Firm*—Cushman, Darby & Cushman

[57] ABSTRACT

A thermal ink-jet type image forming apparatus includes a thermal head and a movable ink film reciprocating on the head. The ink film comprises a pair of ink impermeable portions and an ink permeable portion positioned between the ink impermeable portions pair in the moving direction thereof. A separation layer is provided to each surface of the ink impermeable portions pair of the film at the thermal head side. When the recording operation is completed, one of the separation layers of the ink film is held in contact with the thermal head to prevent the ink film from being held in contact with the thermal head directly. This construction prevents the ink film from adhering to the thermal head by a dried ink after the recording operation is completed.

11 Claims, 10 Drawing Sheets

THERMAL INK-JET TYPE IMAGE FORMING APPARATUS

BACKGROUND OF THE INVENTION

1. Field of the invention

The present invention relates, in general, to image forming apparatus. In particular, the invention relates to a thermal ink-jet type image forming apparatus wherein a thermal head having a plurality of heating elements and an image formation sheet having a large number of ink permeable holes are employed.

2. Description of the prior art

In recent years, non-impact recording systems such as electrostatic recording systems, thermal-sensitive recording systems, thermal transfer recording systems and ink-jet recording systems have been developed. Of the above recording systems, the ink-jet recording system has advantages in that it operates with a low power consumption and low noise. The ink-jet recording system also has advantages in applications requiring increased miniaturization and in multi-color recording apparatus.

Conventional ink-jet recording systems are shown in FIGS. 1 and 2.

FIG. 1 shows one of the ink-jet recording systems. A diaphragm 31 is vibrated in response to the vibration of a piezoelectric element 33 when an AC voltage is applied to piezoelectric element 33. In response to the vibration of diaphragm 31, ink droplets 34 are ejected from nozzle 35 of the apparatus onto a sheet 37.

FIG. 2 shows another ink-jet recording system. A piezoelectric element 39 is wound around a glass tube 41. When piezoelectric element 39 energized, glass tube 41 is compressed repeatedly in response to the vibration of piezoelectric element 39, and ink droplets are ejected from the nozzle of glass tube 41.

However, in those systems described above, the nozzles of the apparatus often become clogged with ink, and a high density arrangement of the nozzles is extremely difficult.

To solve the above-described problems, a thermal ink-jet system has been developed by applicant's assignee. This thermal ink-jet system includes an image formation sheet having a large number of ink-permeable holes, and a thermal head having a plurality of heating elements. When the heating elements are selectively energized, ink droplets, corresponding to the holes opposite the energized heating elements, are ejected, thus printing an image on a recording sheet.

However, in this type of the thermal ink-jet system described above, the ink between the image formation sheet and the thermal head often dries up when the apparatus is left for an extended period of time after the recording operation is completed. The image formation sheet then adheres to the thermal head with the dried ink. Therefore, the image formation sheet is often ripped or damaged when the image formation sheet is redriven under such condition.

SUMMARY OF THE INVENTION

It is an object of the invention to enhance the reliability of the image formation sheet of a thermal ink-jet type image forming apparatus.

It is another object of the invention to smoothly move an image formation sheet against a heating device even after an image forming apparatus has not been used for an extended period of time.

It is still another object of the invention to prevent the image formation sheet of an image forming apparatus from becoming stuck to the heating device of the apparatus due to dried ink.

To accomplish these objects, the image forming apparatus of the present invention comprises a movable image formation sheet for supplying ink onto a recording sheet, a heating device for selectively applying heat to the image formation sheet, and a separation section for separating the movable image formation sheet from the heating device for preventing the image formation sheet from adhering to the heating device when the movement of the image formation sheet is stopped.

The image formation sheet may include a pair of ink impermeable portions and an ink permeable portion, which has a plurality of holes, and is disposed between the ink impermeable portions.

The separation section may include a separation layer respectively adhered to each ink impermeable portion of the image formation sheet.

When the image forming operation is completed, the heating device is held in contact with the separation layer, and thereby, the image formation sheet is not in contact with the heating device directly.

BRIEF DESCRIPTION OF THE DRAWINGS

The present invention is best understood with reference to accompanying drawings in which.

DETAILED DESCRIPTION OF THE PREFERRED EMBODIMENT

An exemplary embodiment of the present invention will now be described in more detail with reference to the accompanying drawings.

Figure 1:
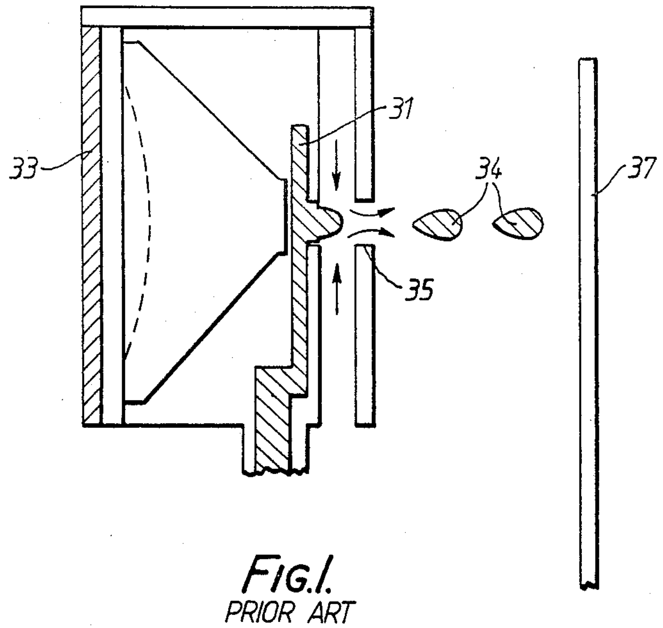
FIG.1. PRIOR ART
FIGS. 1 and 2 are schematic views of conventional ink-jet type printing systems.
Figure 2:
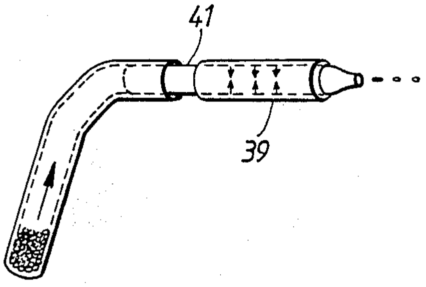
FIG.2. PRIOR ART
Figure 3:
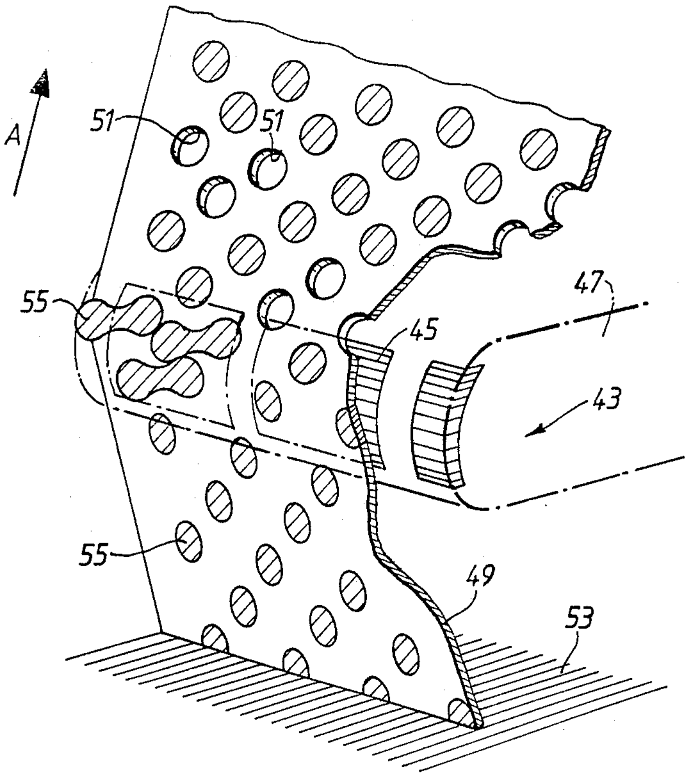
FIG. 3 is a perspective view for explaining an ink-coating state in an ink-jet printer.

FIG. 3 is a perspective view for illustrating the printing principle of a thermal ink-jet printer using one example of the thermal head. A thermal head 43 includes a plurality of heating elements 45 arranged on a base member 47. Heating elements 45 are energized in accordance with an image forming signal from a data processing unit (not shown). Thermal head 43 is covered with an ink film 49 serving as an image formation sheet in the printing operation. Ink film 49 is formed of a metal, organic material, or the like (e.g. a nickel sheet as hydrophilic material), and a large number of holes 51 having a diameter of about 20 to 200 μm are formed therein. Ink film 49 is coated with polyethylene as hydrophobic material. Ink film 49 is held in an ink storage 53 filled with ink. When ink film 49 is moved in the direction indicated by arrow A, small holes 51 pass through ink storage 53 containing ink and are filled with ink 55. When small holes 51 filled with ink have reached thermal head 43 having heating elements 45, heating elements 45 are energized to be heated quickly. Then, ink droplets, corresponding to the holes opposite the energized heating elements, are ejected due to pressure from bubbles upon heating of heating elements 45, thus printing an image on a sheet (not shown).

Figure 4:
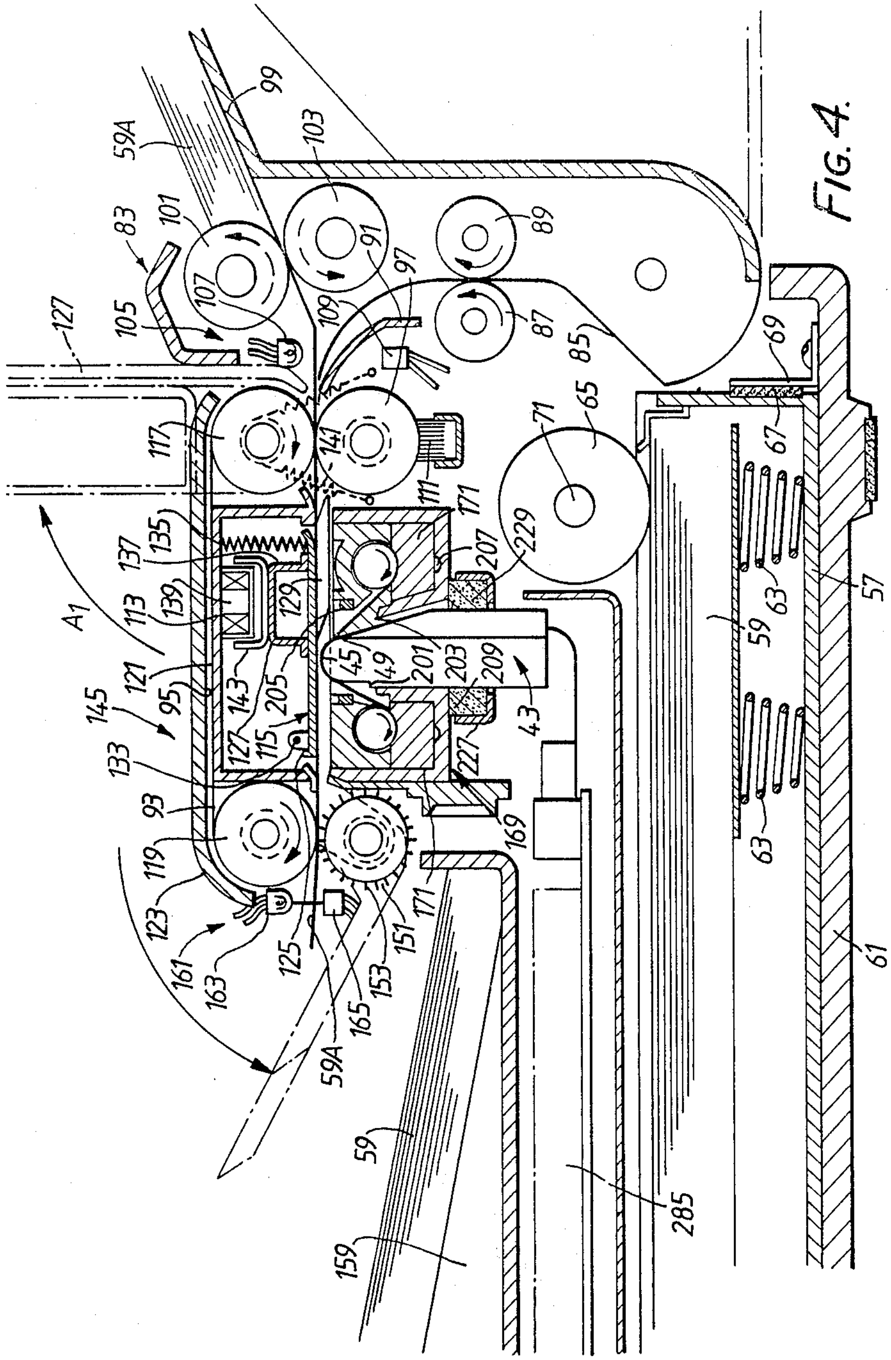
FIG. 4 is a schematic longitudinal sectional view of a printer according to an embodiment of the present invention.
Figure 5:
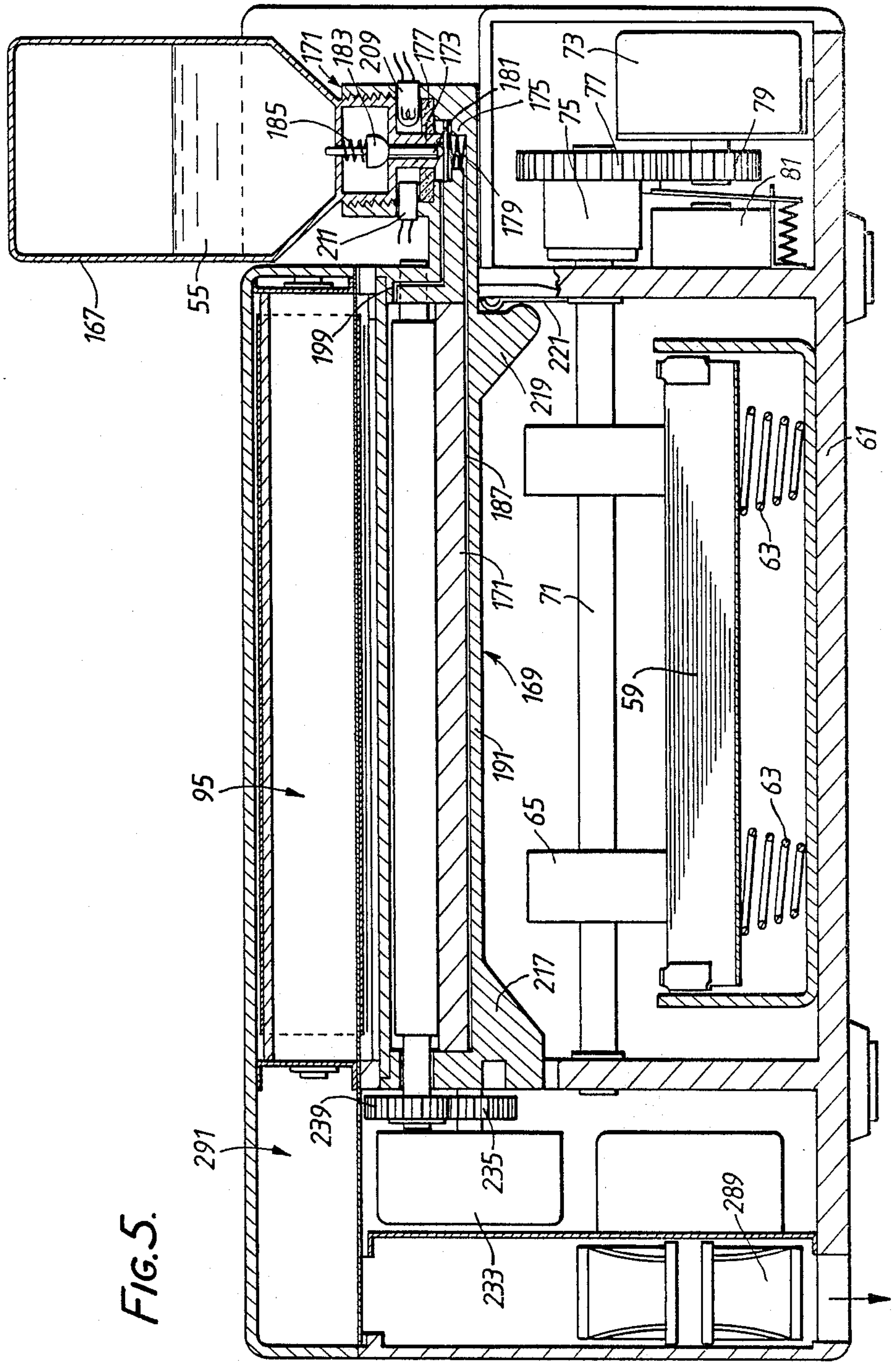
FIG. 5 is a schematic cross-sectional view of the printer shown in FIG. 4.

FIG. 4 and 5 show an ink-jet printer. A paper feed cassette 57 for storing recording sheets 59 is loaded in the lower portion of a housing 61. A lower plate of cassette 57 at the paper pick-up side is pushed upward by the biasing force of a pair of push-up springs 63, and upper-most recording sheet 59 is always in contact with a first feed rollers 65. When cassette 57 is loaded in housing 61, a rubber magnet 67 mounted on cassette 57 magnetically attracts a metal plate 69 mounted on housing 61 to fix cassette 57 to housing 61.

A shaft 71 axially supports first feed rollers 65 and is coupled to a paper feed motor 73 through a spring clutch 75 and gears 77 and 79, as shown in FIG. 5. Spring clutch 75 is engaged/disengaged by a solenoid 81. When solenoid 81 is energized in response to a recording signal from an image or data processing apparatus (not shown) connected to printer 83, clutch 75 engages shaft 71 with gear 77. Therefore, rotating power from motor 73 is transmitted to shaft 71 through gears 77 and 79 and clutch 75, and uppermost recording sheet 59 is conveyed by contacting rollers 65.

Recording sheet 59 picked up from cassette 57 through rollers 65 is guided upward along a first paper feed guide 85, and then clamped and conveyed by a pair of feed rollers 87 and 89. Rollers 87 and 89 are arranged in a paper feed direction and in rolling contact with each other. Thus, sheet 59 is fed between first and second paper feed guides 85 and 91. Sheet 59 is fed until its front edge abuts against an attraction conveyor belt 93 of a paper convey unit 95 (to be described later) and a register roller 97, which is in rolling contact therewith and is stopped, thus standing by at this position.

Printer 83 is provided with a manual paper feed table 99 for manually feeding sheets in addition to those in cassette 57. When manual recording sheets 59A (e.g., thick sheets) are set on table 99, they are picked up one by one starting with the lower-most sheet by means of a second feed roller 101 and a separation roller 103. The sheets 59A are fed until the front edge thereof abuts against belt 93 and roller 97 in the same manner as in the paper feed operation from cassette 57. In this state, sheet 59A stands by.

Roller 97 is coupled to motor 73 through a clutch (not shown), and is rotated upon engagement of the clutch. A paper detector 105 for detecting the presence/absence of paper is provided beween register roller 97 and second feed roller 101. Detector 105 comprises a first light-emitting diode (LED) 107 and first photosensor 109 for receiving light emitted from LED 107. When the front edge of sheet 59 shuts off the light from LED 107, it abuts against the rolling contact portion of roller 97 and belt 93 a given time (e.g., 2 to 3 sec) after photosensor 109 is turned off. Thus, sheet 59 is appropriately bent.

In this bending of the sheet, the inclination of the front edge of sheet 59 (skew) can be corrected, and the front edge is accurately fed into the rolling contact portion of roller 97. Therefore, sheet 59 can be satisfactorily clamped between roller 97 and belt 93.

It should be noted that a dust removing brush 111 for removing paper dust attached to the circumferential surface of roller 97 is in sliding contact with the lower surface of roller 97, thus preventing the recording surface of sheet 59 from being contaminated.

Figure 6:
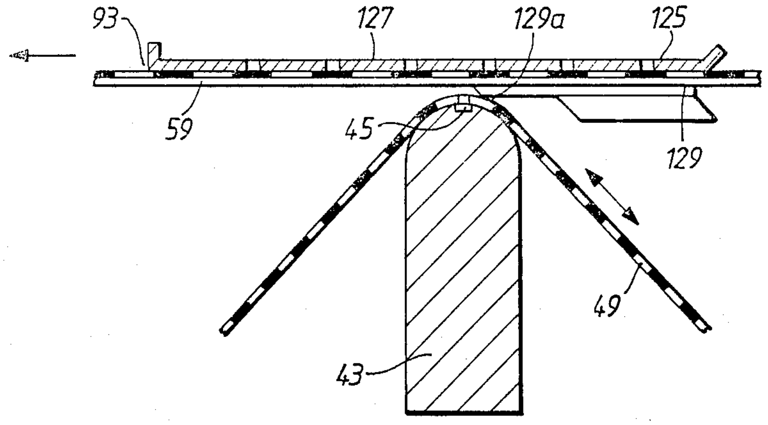
FIG. 6 is a side view of a thermal head with regard to a recording guide, as shown in FIG. 4.

Paper convey unit 95 comprises first and second floating sections 113 and 115. First floating section 113 incorporate first and second rollers 117 and 119, belt 93 looped between rollers 117 and 19, and an air suction duct 121 in a cover 123. Second floating section 115 coomprises a belt guide plate 125 and a belt urging-/separating mechanism 127. The mechanism 127 urges belt 93 against or separates it from a flexible film guide 129 which guides sheet 59 to thermal head 43, as shown in FIG. 6.

In mechanism 127, belt güide plate 125 is pivotally supported at one end by a hinge 133 in duct 121, and the other end thereof is biased downward by a spring 135, thus urging belt 93 against guide 129. An attraction member 137 is mounted on the back surface of guide plate 125 to face an electromagnet coil 139. When coil 139 is energized, guide plate 125 is shifted against the biasing force of spring 137.

First floating section 113 is biased against roller 97 by a spring 141 looped around roller 117. The spring has two ends fixed to housing 61, and guide plate 125 of second floating section 115 is elastically suspended by spring 135. Therefore, even if supplied sheet 59A is thick, sections 113 and 115 can be shifted accordingly.

A high-viscosity fluid shock-absorber 143 is mounted on plate 125 of second floating section 115 to absorb shocks applied to plate 125.

Paper convey unit 95 is pivotally supported coaxially with the shaft of first roller 117, and can pivot in the direction indicated by arrow A1 to open a paper convey path. Therefore, if a paper jam occurs midway along the convey path, the jammed paper or the cause of the jam can be eliminated easily.

When roller 97 begins to rotate, the front edge of sheet 59 is clamped between roller 97 and belt 93 of first floating section 113 at an appropriate pressure by the biasing force of spring 141. Then, sheet 59 is conveyed by the clamping and conveying force of rollers 97 and 117 and the attraction and conveying force of belt 93.

In this case, sheet 59 is urged against guide 129 by mechanism 127, and is guided to a print unit 145 to be slid along guide 129.

As can be seen in FIG. 6, guide 129 having a 0.2 mm thickness is fixed with reference to thermal head 43, so that the surface of guide 129 is separated from heating elements 45 of head 43. In other words, the surface of guide 129 is always in contact with the surface of film 49 (image formation sheet).

Therefore, the recording surface (lower surface) of sheet 59 is separated by a small gap because of the thickness of guide 129 (i.e., 0.2 mm) from the surface of film 49 which moves to contact heating elements 45 of thermal head 43.

In this embodiment, the gap between the surfaces of film 49 and sheet 59 is kept within the range of about 0.1 to 0.3 mm when a resolution of 8 lines/mm is to be maintained. It may appear that the recording surface of sheet 59 might be in contact with ink 55 filled in holes 51 of film 49 due to the small gap between film 49 and sheet 59. In this case, however, since the surface of guide 129 has a hydrophobic character, and the edge portion (front edge 129*a*) thereof adjacent to heating elements 45 (thermal head 43) is formed in a knife-edge shape, as shown in FIG. 6, the ink on the surface of film 49 is drawn into the under surface of guide 129 along the moving direction of film 49, thus preventing the ink from expanding or percolating to the recording surface side of film 49.

In this embodiment, film 49 is formed of a polyimide film with a thickness of 12.5 μm. This film 49 is treated by a photo-etching process and a large number of holes having a diameter of about 25 μm and 30 μm are formed therein. The surface of ink film 49 facing sheet 59 is coated with a hydrophobic material such as polytetrafluoroethylene. Furthermore, since the surface of ink film 49 facing sheet 59 and the surface of thermal head 43 are coated with a siloxane derivative of about 3 μm thickness as an abrasion resistance material, abrasions and scratches of ink film 49, which moves in contact with the surface of thermal head 43 during printing, are prevented.

The siloxane derivative is manufactured by obtaining a colloidal dispersion of partially hydrolyzed material, after reacting four functional silicon tetra chloride with water in a solution of a prescibed amount of monohydric alcohol and ester.

The siloxane treatment forms a membrane of silica on the surface of ink film 49. Since the membrane of silica has heat-resistant, hygroscopic and hydrophilic properties, the ink uniformly adheres to the surface of film 49 (the membrane of silica) and is rapidly fed to heating elements 45 by capillary action through the contact surface between thermal head 43 and film 49.

Figure 7:
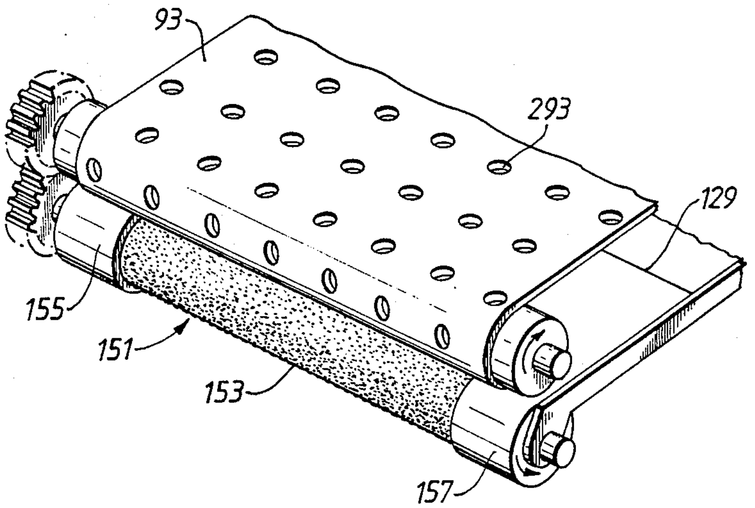
FIG. 7 is a partial perspective view of a paper discharge unit.

After printing, when the front edge of sheet 59 further moves forward, it is clamped between second roller 119 of first floating section 113 and a paper discharge roller 151. In this embodiment as shown in FIG. 7, the recording surface of sheet 59 is supported by needle-shaped portion 153 having needles projecting from the circumferential surface of roller 151. Reference roller portions 155 and 157 are provided at both end portions of roller 151 and are in rolling contact with belt 93. Therefore, sheet 59 can be conveyed without receiving excessive pressure, thus protecting the undried image from deterioration. More specifically, since the ink ejected on sheet 59 is not rubbed by rollers surface, a clear image can be obtained.

Sheet 59 moves forward further and the rear edge thereof passes through the rolling contact portion between resistor roller 97 and first roller 117.

In this case, a force for urging sheet 59 against guide 129 is transmitted through mechanism 127, and belt guide plate 125 of second floating section 115 is pushed upward relative to the housing of first floating section 113 by a reaction force to plate 125 from guide 129 against the biasing force of spring 135 through shock-absorber 143.

After the rear edge of sheet 59 has passed between rollers 97 and 117, roller 97 and belt 93, which are temporarily separated, are again brought into rolling contact with each other by their weights. Therefore, the pressure applied on sheet 59 is reduced to the total weight of plate 125 and the biasing force of spring 135, and sheet 59 can be smoothly conveyed.

If the rear edge of sheet 59 receives the total weight of paper convey unit 95, sheet 59 must be conveyed while receiving a large frictional force, resulting in unstable conveyance.

When sheet 59 moves further forward and the rear edge thereof has passed by the edge portion of guide 129 at the side of thermal head 43, guide plate 125 has already been pushed upward through shock-absorber 143, and can be moved downward slowly by the shock-absorbing effect of shock-absorber 143. Therefore, the rear edge of sheet 59 can pass by heating elements 45 of thermal head 43 while sheet 59 is approaching the surface of film 49. If belt guide plate 125 does not receive any reaction force and is moved downward by the combination of its total weight and the biasing force of spring 135, the surface of film 49 is brought into contact with the recording surface of sheet 59 immediately after the rear edge of sheet 59 passes through the edge portion of guide 129, thus contaminating the rear edge of sheet 59 with ink.

In this embodiment, when the rear edge of sheet 59 passes above heating elements 45, belt guide plate 125 is upwardly attracted by the energization of electromagnetic coil 139. Sheet 59 is also moved upward with belt guide plate 125, thus preventing the rear edge of sheet 59 from contacting the surface of film 49. When belt guide plate 125 is moved upward, as described above, the edge portion of gude 125 which is softly pressed to film 49 is also moved upward by its restoration force. Sheet 59 is directed by guide 125 until the rear edge of sheet 59 passes the front edge 129*a* of guide 125.

In addition to the above-described operation, when the front or read edge of sheet 59 falls within the range of about 6 mm (non-recording area) from heating elements 45 forward and backward along the paper conveyor direction, electromagnetic coil 139 is energized to attract guide plate 125 upward. Then, sheet 59 separates from the surface of film 49, thus preventing the front or rear edge of sheet 59 from contacting the surface of film 49 even if the front or rear edge of sheet 59 is folded or bent.

Figure 13:
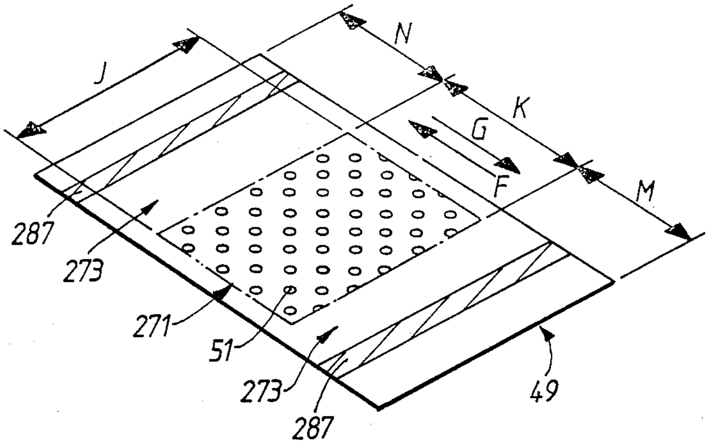
FIG. 13 is a partial perspective view of the ink film.

Furthermore, electromagnet coil 139 is energized until thermal head 43 is covered with one of the non hole portions 273 of film 49, as shown in FIG. 13, after the recording operation is completed.

After thermal head 43 is covered with the non-hole portion, electromagnet coil 139 is deenergized, and then guide 125 contacts with film 49. Therefore, no ink remains on the contacting portion between film 49 and guide 125, undesirable affection to the recording by the deterioration of the ink can be prevented.

In this way, contact and contamination of sheet 59 by film 49 is eliminated. Sheet 59 passes by roller 151 while a small gap is maintained between belt 93 and film 49, and sheet 59 is discharged onto a paper discharge tray 159 without being contaminated.

A detector 161 for detecting whether sheet 59 has been discharged is provided between rollers 153 and 119 at the side of tray 159. Detector 161 includes a second LED 163 and a second photosensor 165 facing the paper convey path. When sheet 59 is discharged to tray 159 and the rear edge thereof passes by LED 163, an ON-signal of photosensor 165 is generated to signal the completion of the sheet discharging operation.

The ink supply from an ink tank 167 to a film cartridge 169 and from an ink storage 171 of cartridge 169 to ink film 49 will be described with reference to FIG. 4 and 5.

As shown in FIG. 5, film cartridge 169 and ink tank 167 are detachably mounted, as described later. Ink 55 is stored in tank 167, which is screwed in and fixed to an ink-tank mounting portion 171 of cartridge 169. A transparent ink supply tube 173 of tank 167 pushes a valve 175 of cartridge 169 into tight contact with a seal 177 for sealing mounting portion 171 against the biasing force of a spring 179. Valve 175 of cartridge 169 pushes an ink-tank open/close rod 181 upward and, therefore, pushes a valve 183 of tank 167 against the biasing force of a valve spring 185, thus supplying ink 55 from tank 167. Ink 55 is supplied from tank 167 until the obliquely cut distal end portion of tube 173 is filled with ink 55. Ink 55 is caused to flow into narrow ink supply paths 187 and 189 formed in a container portion 191 of cartridge 169 through smal holes formed in the surrounding portion of valve 175 of cartridge 169 and a guide path 193, as shown in FIG. 11.

Ink 55 soaks into felt ink supply members 195 and 197 (shown in FIG. 11), and is coated on film 49 therethrough. Therefore, as shown in FIG. 3, small holes 51 of film 49 are filled with ink 55, and ink droplets are formed by bubbles upon rapid heating by heating elements 45.

In mounting portion 171, when ink 55 is consumed and the level of ink 55 drops below the obliquely cut distal end of tube 173, air is taken from an air suction path 199 formed in ink storage 171 of cartridge 169 into ink tank 167, thus feeding new ink 55. As can be seen in FIGS. 4 and 5, air suction path 199 is formed in the upper portion of mounting portion 171, so that its volume is set as small as possible. As will be described later, air communication with respect to ink storage 171 is allowed only when small holes 51 of film 49 pass by elastic rubber excessive ink removing members 201, 203, 205 and 207, shown in FIGS. 4 and 11, which also act as seal members. Thus, ink 55 can be refilled from tank 167 to ink storage 171 when film 49 is moved, but this operation is not allowed when cartridge 169 is exchanged or removed. Thus, ink 55 wil not be excessively fed to cartridge 169, and leakage thereof is prevented.

Figure 11:
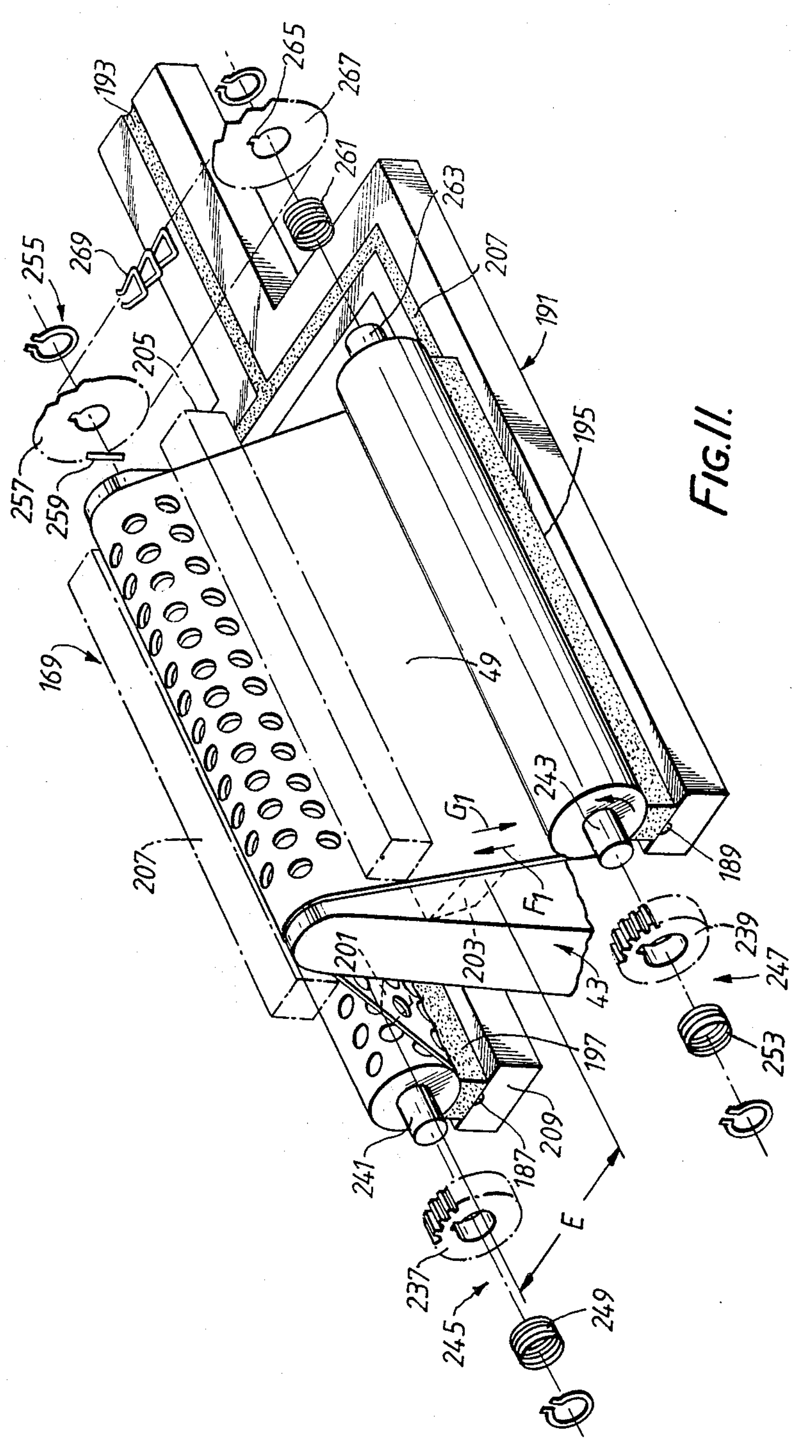
FIG. 11 is a perspective view of a print unit.

As shown in FIG. 11, since ink 55 is supplied to film 49 through felt ink supply members 195 and 197, it will not form a free surface as liquid in ink storage 171. Since, ink 55 is trapped in the felt fibers by its surface tension, it cannot leak outside cartridge 169.

The operation when tank 167 is demounted from mounting portion 171 of cartridge 169 will be described below.

When ink 55 in tank 167 is used up upon refilling thereof, the level of ink 55 drops further and reaches tube 171. At this time, light emitted from an ink detection LED 209 is transmitted through tube 173 to turn on an opposing ink detection photosensor 211, thus producing a detection signal. Thereby, a no-ink state of ink tank 167 can be detected.

Then, printer 83 displays the no-ink state on a display portion thereof or on a display portion of the data processing apparatus (not shown) connected thereto. When ink 55 is not supplied to head 43, the no-ink state of tank 167, i.e., a need for replacement ink, is signaled. Ink tank 167 is thus replaced. In this case, a demounting procedure and the operation of valve 183 of tank 167 and valve 175 of cartridge 169 are performed in a manner opposite to the mounting operation. More specifically, valve 175 of cartridge 169 moves upward and is brought in tight contact with the lower surface of seal 177 by the biasing force of spring 179, thereby preventing ink 55 in cartridge 169 from being leaked therefrom.

It should be noted that in this embodiment, tank 167 has a volume of about 100 cc, and except for tube 173, is formed of a non-transparent material in consideration of weather resistance. About 2,000 to 5,000 A4-size sheets can be printed at a normal recording density using about 100 cc of ink. Film cartridge 169 is preferably replaced after about 100,00 A4-size sheets are printed or after about 3 years have passed. Replacement is necessary due to clogging of small holes 51 of film 49 by paper dust, mold, dried ink, and the like. For this purpose, cartridge 169 and tank 167 are separately arranged. In addition, with the above structure, leakage or evaporation of ink 55 from tank 167 can be prevented.

Mounting of film cartridge 169 on printer 83 will be described.

In printer 83, thermal head 43 is fixed to housing 61, and a window 213 (shown in FIG. 10) is formed in container 191 positioned at a film exposing portion 215 of cartridge 169. Therefore, thermal head 43 can be inserted therethrough to be set on housing 61.

As shown in FIG. 5, a first supporting portion 217 of cartridge 169 is inserted in housing 61, and a second supporting portion 219 thereof at its other end is pushed downward. In this case, a cartridge fixing spring 221 is moved to the right in FIG. 5, and the recess portion of second supporting portion 219 is engaged with the head portion of spring 221, thereby fixing cartridge.

With the above arrangement of this embodiment, container 191 of cartridge 169 has a window, thus providing sufficient mechanical strength to cartridge 169.

As described above, cartridge 169 can be easily mounted or demounted, even if ink tank 167 is mounted thereon. The color of ink 55 can be changed simply by replacing cartridge 169. When cartridge 169 is mounted or demounted, guide plate 125 pivots upward as indicated by arrow A1 in FIG. 4, and guide 129 pivots as indicated by arrow B1, to widely open the upper portion of cartridge 169, this allows easy removal of jammed paper in paper convey unit 95 and paper dust attached to film 49, and facilitates replacement of cartridge 169.

Figure 10:
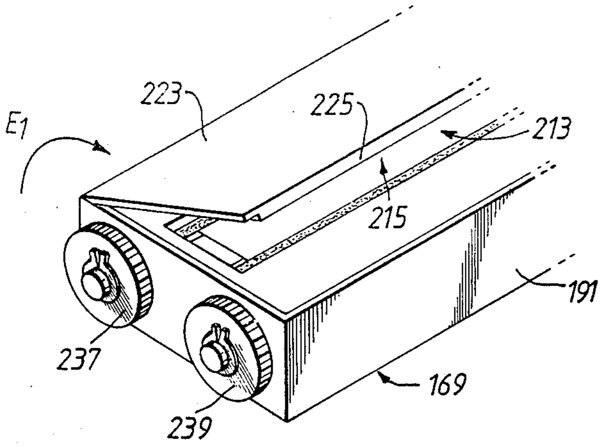
FIG. 10 is a partial perspective view of a film cartridge.

When cartridge 169 is demounted, in order to prevent leakage or evaporation of remaining ink 55 in cartridge 169, a cartridge cover 223 is pivotally hinged on film exposing portion 215 of cartridge 169, as shown in FIG. 10. Cover 223 pivots to cover film exposing portion 215, as indicated by arrow E1. A projection 225 of cover 223 is in tight contact with excessive ink removing members 201, 203, 205 and 207, thus providing a seal to cartridge 169.

As shown in FIG. 4, in this embodiment, a pair of ink absorbing members 227 and 229 are arranged to be in contact with the lower portion of thermal head 43, thereby absorbing ink flowing along the wall of thermal head 43. Therefore, ink leakage from head 43 can also be prevented.

The drive operation of ink film 49 will now be described.

Figure 8:
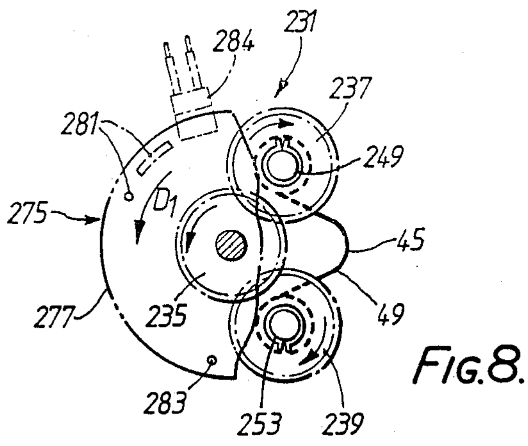
FIG. 8 is a side view showing a main portion of a film convey unit of the printer shown in FIG. 4.
Figure 9:
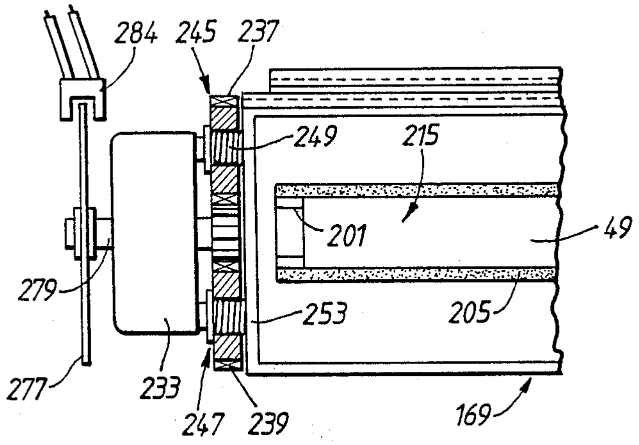
FIG. 9 is a plan view of the film convey unit shown in FIG. 8.

FIG. 8 is a side view of a film drive mechanicm 231 as a printing medium drive mechanism, and FIG. 9 is a plan view thereof. Film drive mechanism 231 comprises a film drive motor 233 and a gear 235 mounted on the shaft of motor 233. Gear 235 is meshed with gears 237 and 239 of a pair of rolls 241 and 243 (shown in FIG. 11) around which film 49 is wound. One-way clutch 245 is interposed between roll 241 and gear 237, and one-way clutch 247 is similarly interposed between roll 243 and gear 239. Note that motor 233 can be rotated in the reverse direction, and ink film 49 can be moved upward or downward in FIG. 8.

As shown in FIG. 11, one end of a left-wound spring 249 is fitted in film roll 241. This end is engaged with the recess portion of gear 237. When gear 237 is rotated clockwise, spring 249 is more tightly wound around roll 241, thus transmitting power from gear 237 to roll 241.

In this case, gear 239 causes a right-wound spring 253 fitted in roll 243 to be loosened from roll 243. In this embodiment, however, since roll 243 and spring 253 are rotated in the same direction, they slip.

When film cartridge 169 is mounted or demounted, since gears 237 and 239 are separately meshed with motor gear 235, film 49 may be kept slack or an excessive tension may be continuously applied therein. In the latter case, film roll 243 and spring 253 can slip to alleviate excessive tension.

As shown in FIG. 11, cartridge 169 is provided with a film tension mechanism 255 for applying a given tension to film 49 at the side opposite rolls 241 and 243. Film tension mechanism 255 removes slack in film 49, and causes film 49 to be pressed against heating elements 45 of thermal head 43 at an appropriate pressure. A ladder wheel 257 is fixed to one end of roll 241 by a pin 259, and a left-hand wind torsion spring 261 is fitted in one end portion 263 of roll 243. The other end of torsion spring 261 is engaged with a notch portion 265 of a ladder wheel 267, which is coupled to wheel 257 through a ladder chain 269. Referring to FIG. 11, torsion spring 261 is twisted so that roll 243 is biased counterclockwise and roll 241 is biased thereby clockwise when ladder chain 269 is looped between ladder wheels 257 and 267. Therefore, an appropriate tension can be applied to film 49 in accordance with a torsion force (i.e., torque) from torsion spring 261. As a result, when film 49 is mounted on printer 83, it can be slidably moved into tight contact with the distal end portion of head 43 at an appropriate pressure without being slackened.

A case will be described wherein gear 235 is rotated counterclockwise in FIG. 8.

In this case, gear 239 is rotated counterclockwise, and spring 253 is operated to be tightly wound around roll 243. Then, film 49 is moved in a direction to be taken up by roll 243. In this way, upon clockwise or counterclockwise rotation of motor 233, film 49 is reciprocated. In this embodiment, slackening of film 49 can be prevented by the operation of springs 253 and 249 and mechanism 255 when cartridge 169 is mounted or demounted. Thus, film 49 or thermal head 43 will not be damaged due to excessive tension.

As shown in FIG. 13, a first region 271 having a large number of holes 51 and secton regions 273 (non hole portion), which have no holes and are formed at both sides thereof, are formed on film 49. When the printing operation is performed, first region 271 must face heating elements 45. When the printing operation begins, the front end portion of region 271 in the film moving direction reaches heating elements 45. Film position detection mechanism 275, as shown in FIG. 8, while detects the front and rear end portions of first region 271 of film 49, is provided in a film drive mechanism 241.

As shown in FIG. 8 and 9, in detection mechanism 275, a detection wheel 277 for detecting a film position is mounted on a drive shaft 279 of motor 233. In detection wheel 277, first and second slits 281 and 283 are formed at positions corresponding to two boundary portions of region 271 of film 49, i.e., the front and rear end portions in the film moving direction. First slit 281 consists of an elongated hole and a round hole, and second slit 283 consists only of a round hole. Position detector 284 for detecting the positions of slits 281 and 283 with light is arranged to sandwich the edge portion of wheel 277.

When motor 233 rotates, position detector 284 senses short and long light pulses formed by the holes of slit 281, and compares them with a constant clock pulse incorporated in electric control circuit 285 (FIG. 4). As a result detector 284 detects at the rear end of the elongated hole along the clockwise direction that the detected slit is first slit 281. When detector 284 senses a single light pulse transmitted through slit 283, it can detect that the detected slit is second slit 283. Motor 233 receives a stop signal from control circuit 285 when detector 284 detects first slit 281.

When motor 233 is stopped, second region 273 of film 49 (FIG. 13) covers film exposing portion 215 of cartridge 169, and first region 271 is stored in ink storage 171 below ink removing members 205 and 203. Since cartridge 169 is covered with second region 273, it can be sealed from the outer atmosphere.

In this way, evaporation of ink 55 in cartridge 169, which causes an increase in viscosity of ink 55, can be prevented. If the viscosity of ink 55 is increased, the ejection speed of ink droplets from holes 51 is decreased or, in the worst case, ejection therefrom is precluded.

Print unit 145 receives a printing command from data processing apparatus (not shown), connected to printer 83, for processing image or character data, and drives first feed rollers 65 to supply recording sheet 59 to paper convey unit 95. When motor 233 is rotated counterclockwise in the direction indicated by arrow D1 in FIG. 8 by a predetermined number of pulses, film 49 is moved for a predetermined period of time. The front end portion of region 271 of film 49 in the film moving direction is thus positioned at heating elements 45, and awaits arrival of recording sheet 59 to coincide with the front edge of sheet 59. Thereafter, film 49 is moved in synchronism with movement of sheet 59. The moving speed of film 49 (20 mm/sec) is half that of sheet 59 (40 mm/sec).

Figure 15:
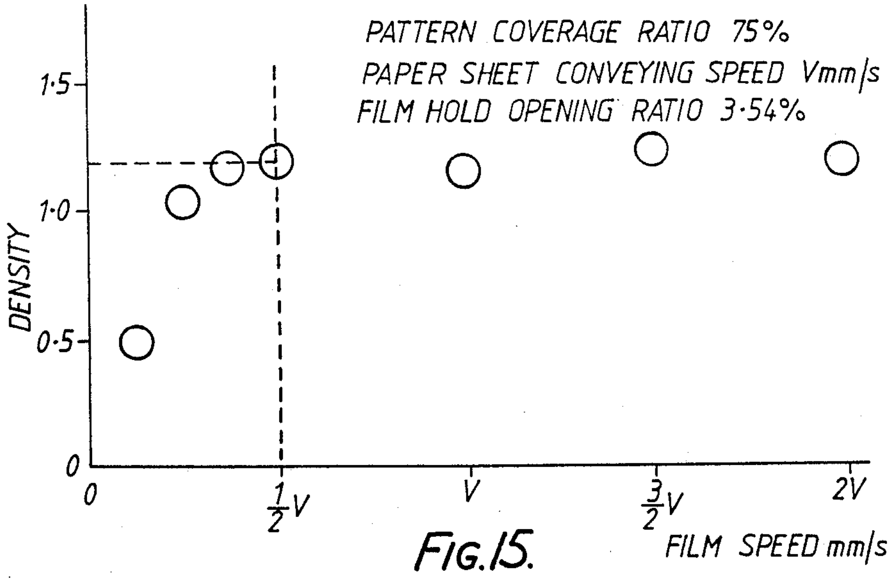
FIG. 15 is a graph showing the relationship between a film speed and a recording density according to an embodiment of the present invention.

As shown in FIG. 15, when the moving speed of sheet 59 is varied within the range of 10 to 100 mm/sec, if the moving speed of film 49 is V/4 or higher with respect to moving speed V of sheet 83, the recording density of sheet 59 can be 1.0 or more (black solid, hole opening ratio 34.5%, coverage ratio of the printing portion to the sheet 75%) regardless of the moving direction of sheet 59 relative to film 49. Note that the hole opening ratio is the ratio of hole area to film area.

Therefore, the moving distance of film 49 can be made shorter than the recording length (recording direction) of sheet 59, the area of first region 271 of film 49 can be reduced, and film 49 can be more easily manufactured. If first region 271 of film 49 has a large area, it is difficult to form uniform-diameter holes (25 to 30 μm) over the entire area of region 271. Therefore, the diameter of holes 51 is reduced at, e.g., surrounding portions, resulting in irregular recording density. However, in this embodiment, the area of first region 271 of film 49 can be reduced, thus obtaining a more regular, uniform image.

When film 49 is subsequently moved, the rear end of first region 271 reaches heating elements 45 from the side of removing members 203 and 205. Film position detector 284 then detects second slit 283. In this case, in order to satisfy the above relationship between the respective positions of film 49 and firt and second slits 281 and 283 of wheel 277, film 49 must be wound on the side of members 203 and 205 upon setting of cartridge 169. In addition, motor 233 must be stopped upon detection of the round hole of first slit 281 by detector 284.

When sheets 59 are continuously supplied and the nth sheet 59 (n is an even integer) is recorded with an image, film 49 is wound until the rear end of first region 271 of film 49 on the side of members 203 and 205 reaches roll 241. Then film 49 is filled with ink 55. Thereafter, film 49 is moved in a direction opposite to the film moving direction as described above. Movement is delayed awaited for a predetermined period of time until arrival of the rear end of first region 271 to align the front end of sheet 59 with the rear end of region 271. Film 49 and sheet 59 are then fed in synchronism with each other for recording.

When (n+1)th sheet 59 is to be recorded, the other end of region 271 on the side of members 201 and 207 is wound around roll 243 to be filled with ink 55, and is then returned to heating elements 45. After the corresponding end of first region 271 of film 49 aligned with the front edge of sheet 59, film 49 is moved.

Since the recording operation is performed by the alternating movement of film 49, continuous recording is possible.

Excessive ink removing members 201, 203, 205 and 207 are alternately arranged to be in contact with film 49, and members 205 and 207 are arranged above members 201 and 203.

Since film rolls 241 and 243 are arranged below the top of thermal head 43, print unit 145 can be made more compact, and sheet 59 can be conveyed while definitely maintaining a gap between sheet 59 and heating elements 45. In addition, when rolls 241 and 243 are arranged below members 201 and 203 at the side of thermal head 43, the distance between members 205 and 207 can be reduced, and the area of film exposing portion 215 can also be reduced. Therefore, a more compact film cartridge 169 can be used.

A case will be described wherein film 49 is moved in the direction indicated by arrow G1 in FIG. 11. Film 49 filled with ink 55 through ink storage 171 is moved upward, and excessive ink is removed from film 49 by excessive ink removing member 201. However, during the recording operation, since first region 271 of film 49 passes by member 201, excessive ink is moved by a constant amount to the side opposite thermal head 43 through first region 271.

Ink moved to the opposite side is removed by excessive ink removing member 207, and is then transferred to the side of thermal head 43. When film 49 is moved in the direction indicated by arrow G1 and region 271 passes by members 201 and 207, a sufficient amount of ink 55 can be coated not only on holes 51, but also on the entire surface of film 49. Therefore, the film moving speed may be reduced to ¼ that of sheet 59.

A case will be described when region 271 of film 49 is moved upward along members 201 and 207. First, ink on the recording surface side of film 49 is removed by member 207. Therefore, dust or paper powder attached to film 49 is removed along with any excessive ink attached thereto. In this case, ink left on the distal end portion of member 207 is moved to the side of thermal head 43 through holes 51 of first region 271, and is again removed by member 201, thus being left on the distal end portion of member 201.

Ink removed and left on the distal end portion of member 201 is then moved to the side opposite to thermal head 43 through holes 51 of region 271. In this way, excessive ink is recovered in ink storage 171 of cartridge 169.

When second region 273 of film 49 passes by members 201 and 207 in the direction indicated by arrow F1 in FIG. 11 (i.e., downward), the surface of film 49 opposite to thermal head 43 has already been cleaned by member 205, and need not be cleaned further by member 207. However, paper powder and rubber dust are deposited on the distal end portion of member 207.

The surface of film 49 at the side of head 43 is also cleaned by member 203, and need not be cleaned by member 201.

When first region 271 of film 49 covers film exposing portion 215 of cartridge 169, the exposed portion of film 49 is cleaned, and the operator need not soil his hands with ink.

As shown in FIG. 13, since lengths M and N of second regions 273 of film 49 are set to be longer than film exposing width E (FIG. 11) of cartridge 169, air communication through a gap between excessive ink removing members 201, 203 205 and 207 can be prevented. Thus, ink can be protected from evaporation, and the viscosity thereof changed. This helps to provide a clear image.

Figure 12:
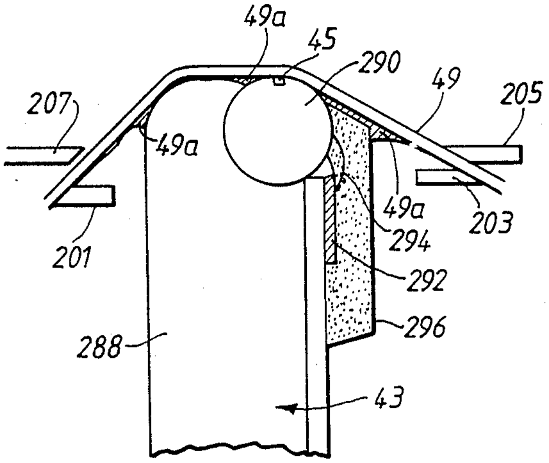
FIG. 12 is a side view of a thermal head assembly with regard to an ink film.

As can be seen in FIG. 12, thermal head 43 comprises a plate-shaped aluminum base 288 and a rod-shaped member (molybdenum-rod) 290, in which heating elements 45, as shown in FIG. 3, are arranged, attached to one end of plate-shaped base 288. A plurality of integrated circuits 292 for energizing heating elements 45 are provided along rod-shaped member 290 on base 288. Each output terminal of integrated circuits 292 is electrically connected to the corresponding heating element 45 by a wire 294. A sealing material 296 covers rod-shaped member 290 and integrated circuits 292, except on heating elements 45, to protect these circuits and connection portions between these elements from dust and moisture.

In FIG. 12, ink adheres to the inner surface of film 49 between excessive ink removing members 201 and 203. In particular ink adheres to the inner surface portion 49*a* of film 49 contacting with thermal head 43, and the surface portions 49*b* and 49*c* of film 49 approaching and leaving thermal head 43.

If the apparatus is left for an extended period of time under the above-described state, the adhered ink on the surface of film 49 dries up and clogs the area between film 49 and thermal head 43.

To prevent the evaporation of ink, the ink used in this embodiment is mixed with a wetting agent, such as, e.g., diethylene glycol, glycerin, low class alkyl ether, etc. The evaporation of ink is extremely restrained in film cartridge 169 and ink tank 167. However, in this case, since the volume of the ink adhered on film 49 is small, and the surface area of the adhered ink contacting with the atmosphere is extremely large as compared with the volume thereof, the adhered ink dries up and clogs this area.

Note that a small amount of the clogged ink can be dissolved after it is soaked in the ink stored in film cartridge 169 fllowing start-up of the appearance. However, if the ink adhered on the surface portions 49*a*, 49*b* and 49*c* of film 49 clogs, film 49 and thermal head 43 may become bonded with the clogged ink. Under this state, tearing of the film may be caused when the film is driven.

As shown in FIG. 13, in this embodiment, since separation layers 287, such as a fluoroplastic adhesive tape, are individually provided on second regions 273 of film 49 which contacts with thermal head 43 when film 49 stops, the adhesion of film 49 to thermal head 43 by the clogged ink can be prevented.

Figure 14:
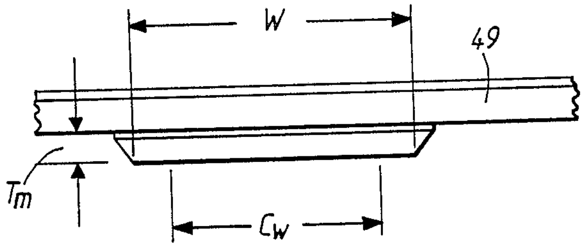
FIG. 14 is an enlarged side view of the ink film with a separation layer.

Both ends of separation layer 287 in the moving direction of film 49 are tapered for moving film 49 smoothly thereover, as shown in FIG. 14.

To enhance the separation ability of separation layer 287, the width W of layer 287 may be made greater than the contacting width Cw between thermal head 43 and film 49. In the illustrated embodiment, the width W of layer 287 is 10 mm.

The thickness Tn of separation layer 287 depends on the materials thereof. In the preferred case, a thickness less than 500 μm is desirable in consideration of the need for flexibility of the film. It is further desirable to provide separation layer 287 only at the portion of film 49 which contacts thermal head 43 when film 490 is stopped, as shown in FIG. 13.

In the above-described embodiment, fluoroplastic adhesive tape is used as separation layer 287. However, other materials such as polyethylene, silicone resin, nylon etc. may also be used instead of the fluoroplastic adhesive tape.

These materials may be provided on film 45 by means of coating or gluing, instead of applying the adhesive tape.

The operation for removing paper dust adhered to film 49 will be described.

When film 49 is moved in the direction indicated by arrow G1 (FIG. 11), paper powder and dust attached to the distal end portion of member 207 are also moved together with film 49 until they reach heating elements 45 [not shown in FIG. 11] of head 43. Film 49 is clamped between heating elements 45, and slightly reciprocated several times. At the same time, a suction fan 289 (FIG. 5) is energized to attract paper particles or dust on film 49, and this draws them into an air-suction guide 291 through a suction hole 293 (FIG. 7) of belt 93.

As a result, paper powder or dust adhered to film 49 can be removed, thus preventing clogging of holes 51 of first region 271 of film 49.

In this embodiment, since the paper-powder is removed within about thirty seconds after a series of successive recording operations, the print operation is not adversely affected.

When second region 273 of film 49 is exposed from cartridge 169, the paper-powder removing procedure is carried out. Therefore, ink will not be drawn into guide 291, nor become attached to belt 93.

The operation of film 49 after a series of recording operations by print unit 145 now will be described.

After a series of recording operations is completed, film 49 is moved at a lower speed than in the recording mode for a predetermined period of time (several seconds). This prevents ink 55 from being dried by heat from heating elements 46 of head 43 before the recording operation is completed. Next, the paper-powder removing procedure is carried out for about 10 seconds, and film exposing portion 215 of cartridge 169 is then covered with region 273 of film 49.

Excessive ink removing members 201 and 203 are formed of an elastic member, and the edges thereof at the side of thermal head 43 are in tight contact with thermal head 43 at the lower surface of film 49. As a result, ink 55 flowing down along the wall of head 43 can be recovered in ink storage 171 of cartridge 169 through holes 51 of region 271 of film 49. Since members 201, 203, 205 and 207 are formed of a material that is impermeable to air, communication between ink inside cartridge 169 and air outside cartridge 169 is prevented.

The relationship between the diameter of holes 51 of film 49 and the pitch therebetween now will be explained with reference to FIG. 16.

Figure 16:
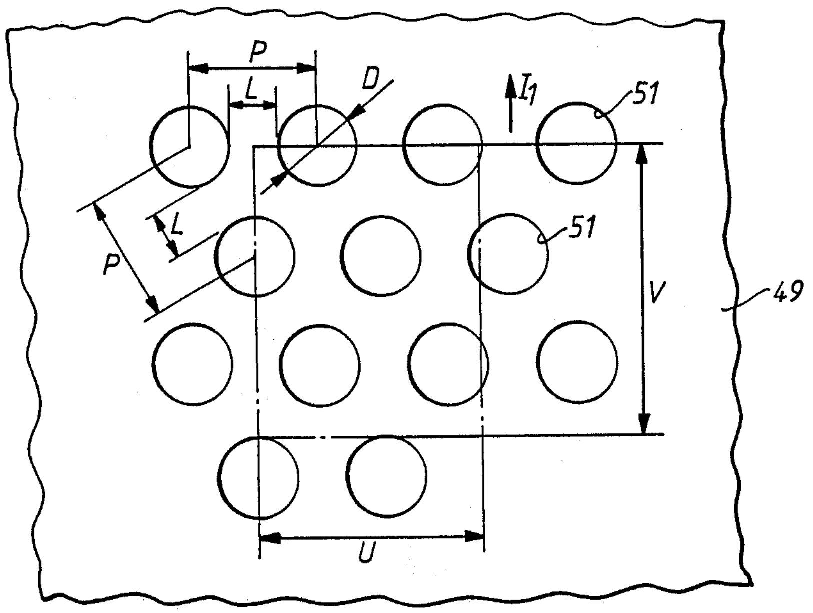
FIG. 16 is a partial plan view of the ink film.

Referring to FIG. 16, arrow I1 indicates the moving direction of film 49, and three adjacent holes 51 are arranged to form regular triangle. In FIG. 16, reference symbols H and V indicate dimensions of heating elements 45, which are respectively 100 μm to 125 μm. Reference symbol D denotes the diameter of hole 51, which is 25 μm; P, the pitch between the centers of adjacent holes 51, which is 45 μm, and L, the minimum distance between adjacent holes 51, which is 20 μm. From tests, it was found that when a maximum distance between adjacent holes 51 was given by P, relations $H \geqq 2P$ and $V \geqq 2P + D$ were satisfied. In addition, in the case of a resolution of 8 lines/mm, when diameter D of hole 51 fell within the range of D=15 to 35 μm and P fell within the range of P=40 to 50 μm, good printing quality could be obtained.

The present invention has been described with respect to a specific embodiment. However, other embodiments such as heat-sensitive type printers, thermal transfer type printers etc. based on the principles of the present invention should be obvious to those of ordinary skill in the art. Such embodiments are intended to be covered by the claims.

What is claimed is:

1. A thermal ink-jet type image forming apparatus for producing with ink an ink image pattern on a recording sheet in response to an image signal, comprising:

movable image formation sheet means made of hydrophilic material including an ink permeable portion having a plurality of holes and a pair of ink impermeable portions for holding ink said ink permeable portion being located between said pair of ink impermeable portions;

heating means contacting said movable image formation sheet means for selectively applying heat to said movable image formation sheet means to cause the transfer of said ink from said image formation sheet means to said recording sheet to obtain said image pattern in response to said image signal; and hydrophobic separating means disposed on at least one of said ink impermeable portions of said image formation sheet means facing said heating means for separating said movable image formation sheet means from said heating means to prevent said image formation sheet means from adhering to said heating means when the movement of said image formation sheet means is stopped, said hydrophobic separating means contacting said heating means when the movement of said image formation sheet means is stopped.

2. An apparatus according to claim 1, wherein said image formation sheet means contacts said heating means over a prescribed contact width, and said hydrophobic separating means includes a separation layer having a width equal to or greater than the contact width.

3. An apparatus according to claim 1, further including means for supporting said heating means in contact with said image formation sheet means.

4. An apparatus according to claim 3, wherein said supporting means has an elongated portion, and said heating means includes a plurality of heating elements arranged on said elongated portion of said supporting means.

5. An apparatus according to claim 1, further including means for supplying said ink to said image formation sheet means.

6. An apparatus according to claim 1, wherein said image formation sheet means has a surface which contacts said recording sheet and further includes a coating of polytetrafluoroethylene on the surface thereof.

7. An apparatus according to claim 1, wherein said hydrophobic separating means includes a separation layer.

8. An apparatus according to claim 1, wherein said hydrophobic separating means includes a separation layer made of polyethylene.

9. An apparatus according to claim 1, wherein said hydrophobic separating means includes a separation layer made of silicone resin.

10. An apparatus according to claim 7, wherein said separation layer includes a fluoroplastic adhesive tape.

11. An apparatus according to claim 10, wherein said separation layer includes an adhesive surface contacting said image formation sheet means over a predetermined width, and a separation surface contacting said heating means, the separation surface of said separation layer having a width smaller than the width of said adhesive surface.

* * * * *